F. R. POTTS.
AUTOMOBILE POWER PULLEY.
APPLICATION FILED APR. 16, 1917.
1,280,834.
Patented Oct. 8, 1918.
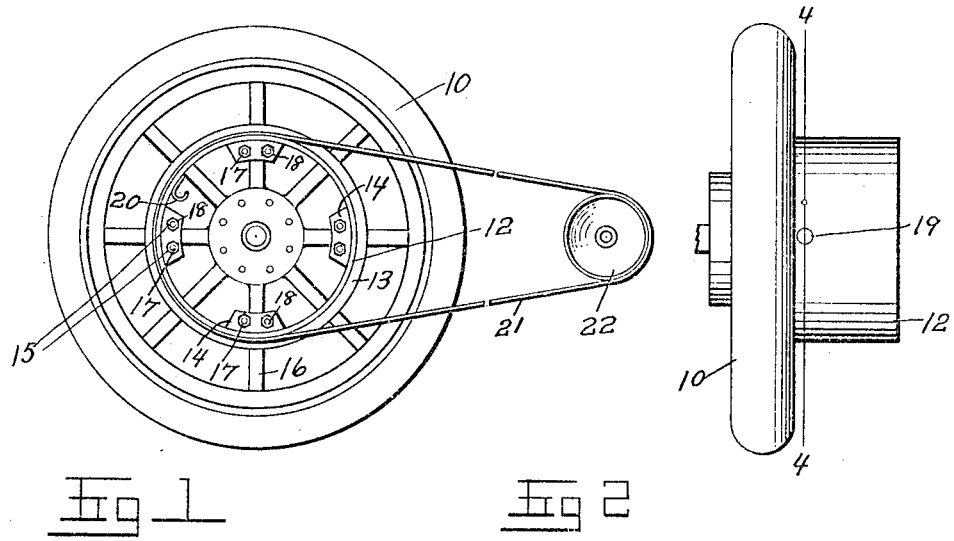
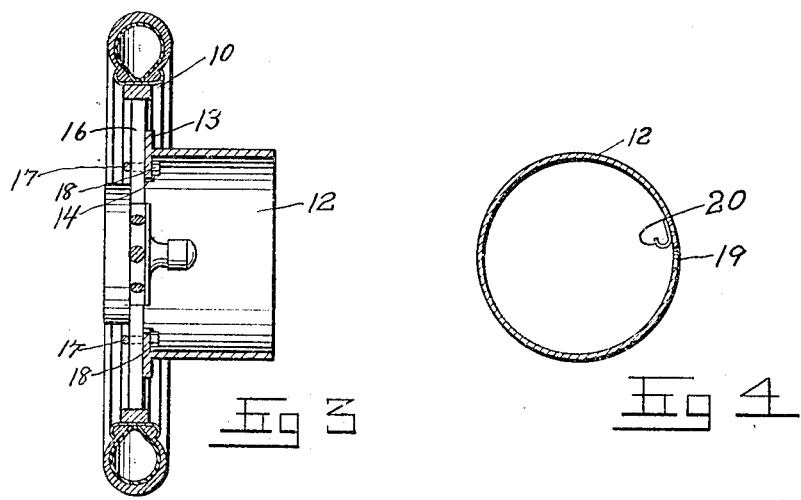
Witnesses
B.E. Wiglesworth.
H. M. Test.
Inventor
F. R. Potts.
By [signature]
Attorneys

UNITED STATES PATENT OFFICE.

FISHER R. POTTS, OF BOLCKOW, MISSOURI.

AUTOMOBILE-POWER PULLEY.

1,280,834.  Specification of Letters Patent.  Patented Oct. 8, 1918.

Application filed April 16, 1917. Serial No. 162,373.

*To all whom it may concern:*

Be it known that I, FISHER R. POTTS, a citizen of the United States, residing at Bolckow, in the county of Andrew, State of Missouri, have invented certain new and useful Improvements in Automobile - Power Pulleys; and I do hereby declare the following to be a full, clear, and exact description of the invention, such as will enable others skilled in the art to which it appertains, to make and use the same.

This invention relates to improvements in power transmitting devices and particularly to power transmitting devices for automobiles.

One object of the present invention is to provide a novel and simple device for attachment to one of the rear wheels of an automobile whereby the driving power of the automobile may be conveniently used for other purposes, such as running farm machinery and appliances.

Another object is to provide a device of this character which can be quickly and easily applied to the wheel.

Another object is to so construct a device of this character that the attaching bolts thereof will not be in the way of the driving belt, nor can they interfere therewith should said bolts become loose.

Other objects and advantages will be apparent from the following description when taken in connection with the accompanying drawing.

In the drawing:

Figure 1 is a side elevation of a wheel having my improved pulley mounted thereon.

Fig. 2 is an edge view of the wheel and pulley.

Fig. 3 is a vertical central sectional view taken through Fig. 1.

Fig. 4 is a transverse sectional view taken on the line 4—4 of Fig. 2.

Referring particularly to the accompanying drawing 10 represents one of the rear wheels of automobile, in connection with which my improved pulley is used.

The pulley includes a hollow drum 12, which is open at both ends, as shown, and has an outwardly directed peripheral flange 13 on one end thereof. On the same end of the drum, but extending radially inward of the drum, are a plurality of apertured ears 14, each of said ears being provided with a pair of openings 15. These ears are arranged to lie outwardly of a certain of the spokes 16 of the wheel and receive therethrough the legs of the U-bolts 17, which embrace said spokes, and receive the nuts 18 thereon. An opening 19 is formed through the drum for the passage of one end of the cable which is used when the automobile is to be pulled out of mud or sand, as will be readily understood. On the inner face of the drum, and adjacent the opening 19, is a hook 20 to which the said end of the cable is adapted to be secured.

Primarily the drum is to be used in connection with the driving belt 21, which is engaged around said drum and around a pulley 22 of some machine which it is intended to drive. The automobile is to be jacked up by means of a suitable jack, and held in such position while the engine is set into motion to drive the rear wheels. This movement drives the drum and belt and the machine, such as a fan mill, threshing machine, corn sheller, or the like. Thus a farmer who owns an automobile is also possessed with an efficient engine which will run various machines otherwise run by hand or requiring special motors.

Attention is particularly called to the fact that the lugs or ears 14 are located on the inner portion of the drum and extend inwardly toward the center of the drum. This precludes any possibility of the U-bolts coming into contact with the driving belt, either while the same is in operation and the bolts secure, or when the bolts become loosened. Were the lugs to extend outwardly from the drum, the bolts would soon wear the edge of the belt, or cause considerable damage should they become loosened.

What is claimed is:

An attachment for the drive wheel of an automobile including a drum having a flange and apertured lugs, attaching means extended through the apertured lugs and engaging with the spokes of the wheel, said drum being formed with an opening in its peripheral face, and a hook secured to the inner face of the drum adjacent the opening.

In testimony whereof, I affix my signature in the presence of two witnesses.

FISHER R. POTTS.

Witnesses:
ALVA C. KENT,
JULIA VAN HORN.

Copies of this patent may be obtained for five cents each, by addressing the "Commissioner of Patents, Washington, D. C."